United States Patent
Yagi

(10) Patent No.: US 9,229,188 B2
(45) Date of Patent: Jan. 5, 2016

(54) IMAGING APPARATUS AND CONTROL METHOD FOR SAME

(71) Applicant: CANON KABUSHIKI KAISHA, Tokyo (JP)

(72) Inventor: Hisao Yagi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 13/957,904

(22) Filed: Aug. 2, 2013

(65) Prior Publication Data

US 2014/0043702 A1    Feb. 13, 2014

(30) Foreign Application Priority Data

Aug. 9, 2012  (JP) ................. 2012-177184

(51) Int. Cl.
G02B 7/02     (2006.01)
G02B 7/10     (2006.01)
H04N 5/232    (2006.01)

(52) U.S. Cl.
CPC  G02B 7/02 (2013.01); G02B 7/102 (2013.01); H04N 5/23212 (2013.01)

(58) Field of Classification Search
USPC ............... 359/811, 813, 815, 819–824, 237, 359/290–292, 298
See application file for complete search history.

(56) References Cited

U.S. PATENT DOCUMENTS

2008/0055753 A1 *  3/2008  Takahashi et al. ............ 359/824

FOREIGN PATENT DOCUMENTS

JP    4165915 B    10/2008

* cited by examiner

*Primary Examiner* — Joseph P Martinez
*Assistant Examiner* — Brandi Thomas
(74) *Attorney, Agent, or Firm* — Cowan, Liebowitz & Latman, P.C.

(57) ABSTRACT

An optical member drive control apparatus includes an acquiring unit configured to acquire first information corresponding to a movement speed of an optical member when a movement of the optical member is controlled and second information corresponding to a movement amount of the optical member; and a controller configured to output a signal to an actuator that moves the optical member and that can detect a drive amount of the actuator per unit time. The controller includes at least a first mode that carries out closed loop control of the actuator according to the detection result of the drive amount of the actuator per unit time and a second mode that carries out open loop control of the actuator, and the controller selects the first mode or the second mode based on the first information and the second information that have been acquired by the acquiring unit.

12 Claims, 11 Drawing Sheets

DURING RETRACTION

DURING EXTENSION

IMAGING APPARATUS AND CONTROL METHOD FOR SAME

BACKGROUND OF THE INVENTION

1. Field of the Invention

The present invention relates to an imaging apparatus and a control method for same.

2. Description of the Related Art

Conventionally, in an imaging apparatus such as a digital camera and a video camera and the like, a stepping motor is used in order to drive the lenses and the like that form a lens barrel quickly and precisely. As a method for rotationally driving this stepping motor at a high speed, a control method is known in which a position detecting apparatus such as an encoder and the like is provided on the motor, and closed loop control (advance angle control) is carried out.

In the case in which the stepping motor is driven at a speed that is equal to or greater than a self-activation area, an acceleration-deceleration operation is required. At this time, in the case in which the positioning of an object is carried out using the number of revolutions of a motor, the amount of movement required for the acceleration-deceleration operation must be taken into consideration. Japanese Patent No. 4,165, 915 discloses a method in which, depending on the amount of movement, the drive control of the stepping motor is switched between open loop control and closed loop control.

However, a method in which switching between open loop control and closed loop control is carried out depending only on the amount of movement is not suitable for driving in which high position precision is required, such as contrast AF (autofocus) processing in an imaging apparatus.

SUMMARY OF THE INVENTION

The present invention takes into consideration the above circumstances, and provides an imaging apparatus that is provided with a stepping motor in which the optimal drive control method is determined based on the drive speed and the drive distance.

An aspect of the present invention is an imaging apparatus that can perform imaging by using an optical system, provided with a drive device that drives the optical system and a control device that drives the drive device, wherein the drive speed of the drive device is divided into a plurality of speed areas depending on the drive speed, and the control device determines one speed area among the plurality of speed areas based on the drive speed and the drive amount, and drives the drive device in the determined speed area.

According to the present invention, an imaging apparatus that is provided with a stepping motor in which the optimal drive control method is determined based on the drive speed and the drive distance can be provided.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings.

Figure 1:
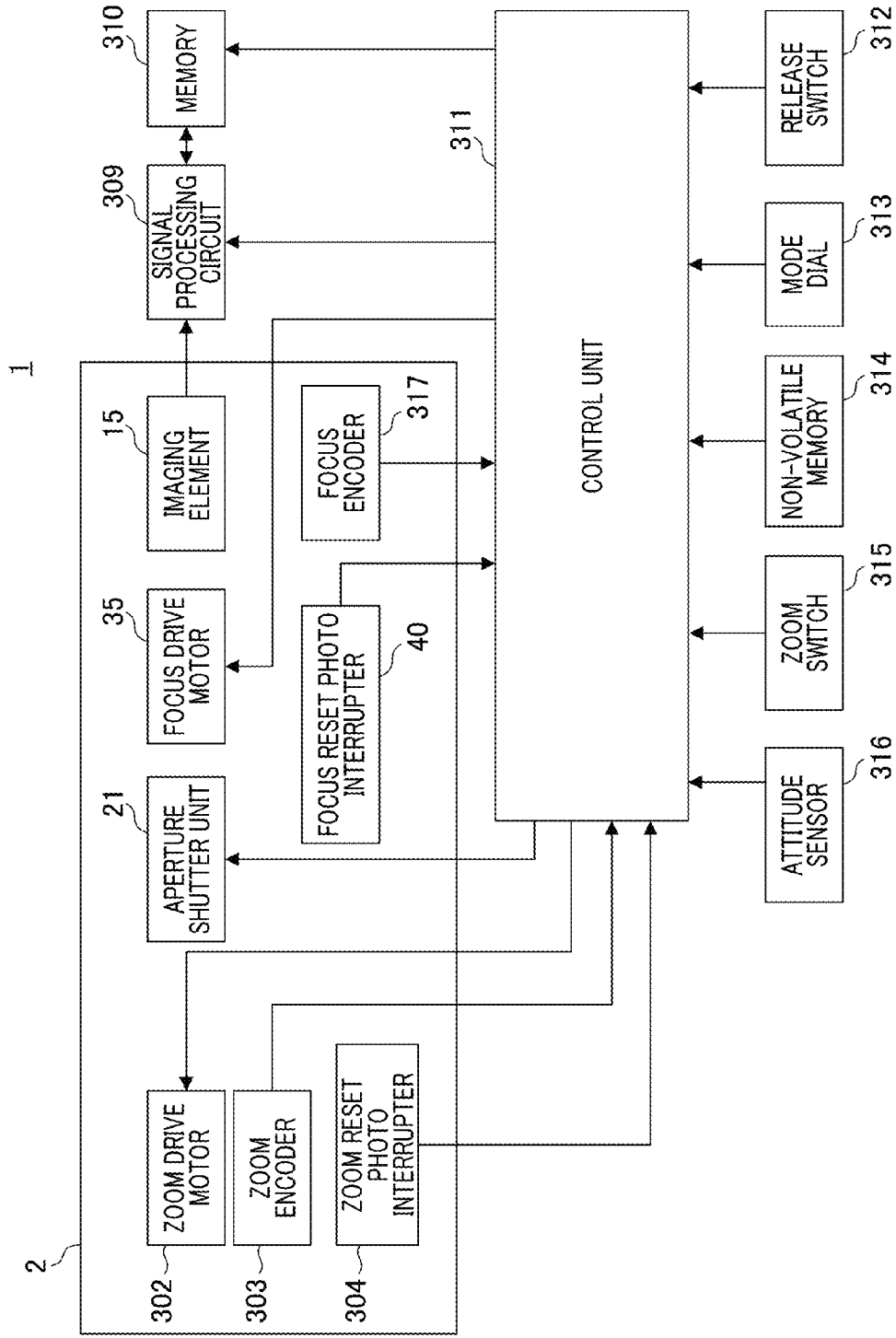
FIG. 1 is a block diagram illustrating a schematic configuration of the imaging apparatus according to an embodiment of the present invention.

Firstly, an imaging apparatus that can perform imaging by using an optical system that applies the present invention will be explained. FIG. 1 is a block diagram illustrating a schematic configuration of an imaging apparatus 1 according to an embodiment of the present invention. This imaging apparatus 1 includes a barrel unit 2, a control unit (control device) 311, a signal processing circuit 309, memory 310, release switch 312, a mode dial switch 313, non-volatile memory 314, a zoom switch 315, and an attitude sensor 316.

The barrel unit 2 includes a zoom lens drive motor 302, a zoom encoder 303, a zoom reset photo interrupter 304, an imaging element 15, and an aperture shutter unit 21. Furthermore, the barrel unit 2 includes a focus lens drive motor (drive device) 35, a focus reset photo interrupter 40, and a focus encoder 317.

The zoom lens drive motor 302 is a motor that drives the lens in order to zoom, and may be used a motor such as a DC motor, a stepping motor, or an ultrasound motor if the drive specifications are satisfied. The zoom encoder 303 is used in order to detect that position of the zoom lens. The zoom reset photo interrupter 304 is used when initializing the position of the zoom lens. The imaging element 15 carries out photoelectric conversion, and outputs an image signal. The subject image that has passed through the zoom lens is focused on the imaging element 15 by the zoom lens. The aperture shutter unit 21 limits the amount of light that enters the imaging element 15 by instructions from the control unit 311, and can maintain the captured image at a suitable exposure. The focus lens drive motor 35 drives the lens for focusing on the imaging apparatus 1, and in the present embodiment, a stepping motor is used. The motor used here is not limited to a stepping motor, but other rotary drive-type motors or linear drive-type motors may be used. In addition, in order to carry out motor drive independently of the zoom lens drive motor 302, driving to a position can be freely performed within a range that does not interfere with the zoom lens. The focus reset photo interrupter 40 is used when initializing the position of the focus lens. The focus encoder 317 is configured by a pulse plate 41 and a photo interrupter 43, described below, and is used when controlling the focus lens drive motor 35.

The control unit 311 carries out control of the imaging apparatus 1 overall. The control unit 311 controls the zoom lens drive motor 302, the focus lens drive motor 35, and the aperture shutter unit 21 while monitoring the outputs of the zoom encoder 303, the zoom reset photo interrupter 304, the focus encoder 317 and the like in the barrel unit 2. In addition, the control unit 311 also controls the signal processing circuit 309 and the memory 310, described below.

The signal processing circuit 309 color-converts the image signal that has been photoelectrically converted by the imaging element 15 and carries out predetermined processing such as gamma processing and the like. The image signal that has been processed by the signal processing circuit 309 is subsequently recorded in the memory 310. The memory 310 is a recording medium, and may be a card and the like.

The non-volatile memory 314 is electrically erasable and recordable, and, for example, an EEPROM or the like is used, and the program for the control unit 311 and the parameters for controlling the imaging apparatus 1 can be recorded. The mode dial switch 313 switches between and sets each of the functions for power OFF, imaging mode, replay mode, and PC connection mode, and carries out the settings therefor. The zoom switch 315 is used during an operation in which photographer switches between wide angle and telephoto photography. The release switch 312 issues instructions to start imaging. The attitude sensor 316 is an acceleration sensor or a sensor that uses the rolling of a ball and senses the direction of gravity to detect the attitude of the imaging apparatus 1.

Figure 2:
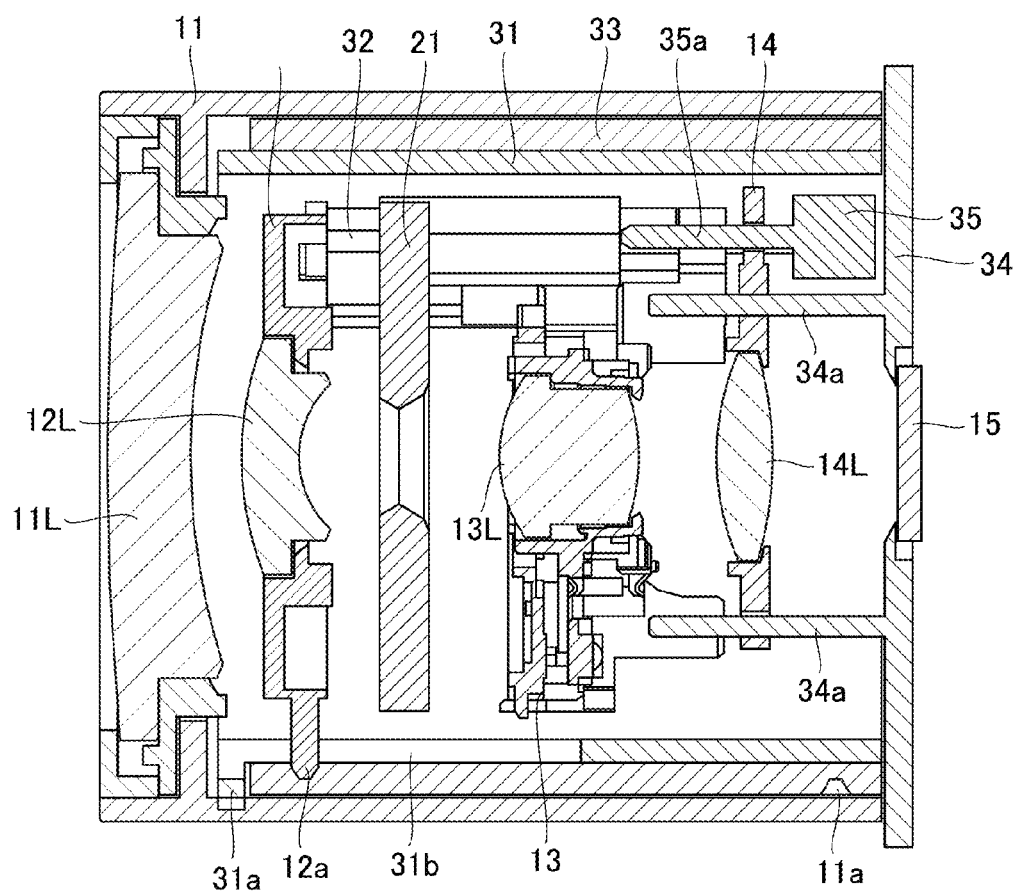
FIG. 2 is a diagram illustrating a configuration of a barrel unit of an imaging apparatus according to an embodiment of the present invention.
Figure 3:
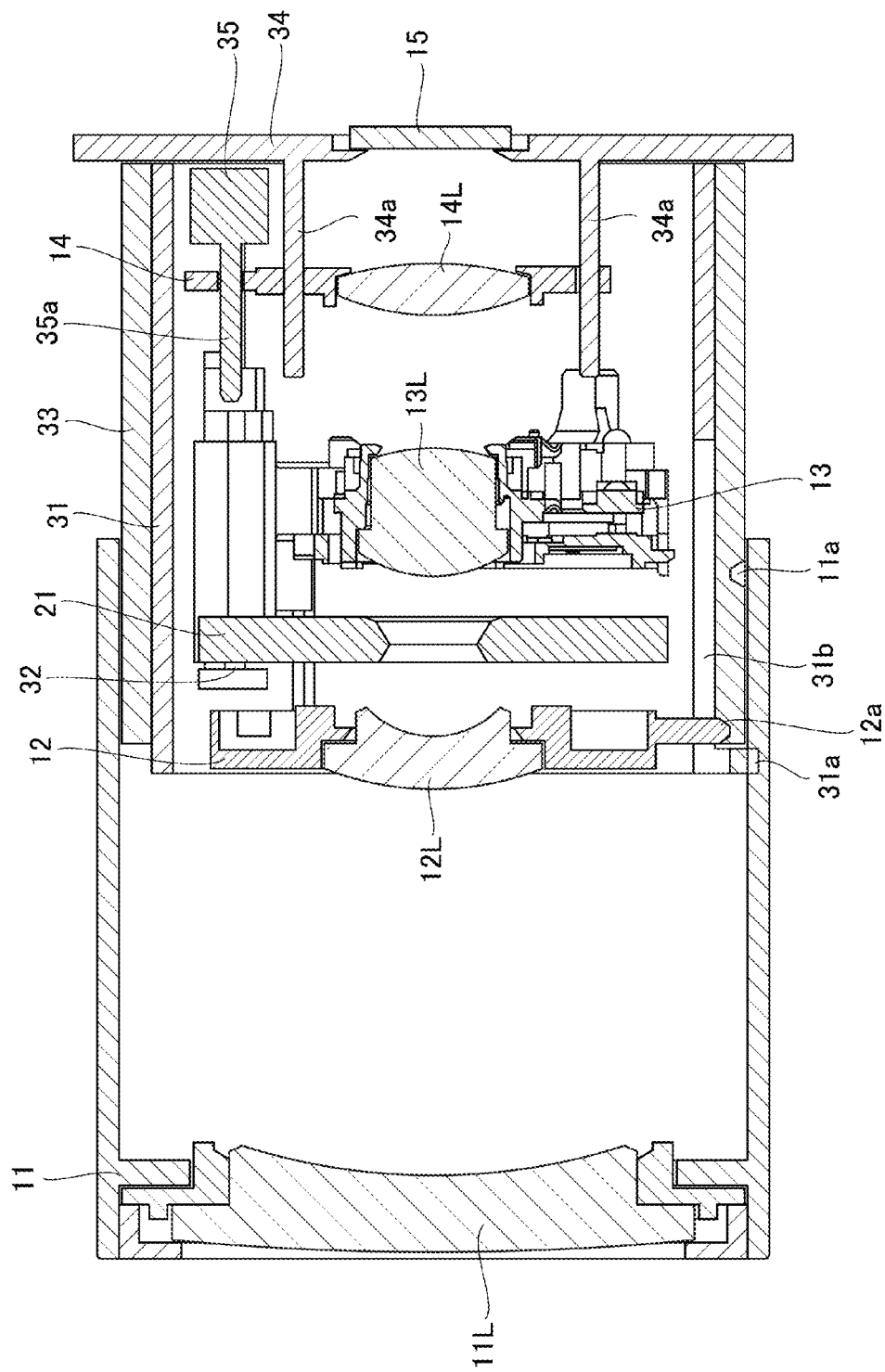
FIG. 3 is a diagram illustrating a configuration of a barrel unit of an imaging apparatus according to an embodiment of the present invention.

Next, referring to FIGS. 2 to 4, the barrel unit 2 according to an embodiment of the present invention will be explained. FIG. 2 and FIG. 3 are cross-sectional views of the barrel unit 2 according to the embodiment of the present invention. FIG. 2 is a drawing in which the barrel unit 2 is in a stored state, and FIG. 3 is a drawing in which the barrel unit 2 is in an imaging state. In addition, FIG. 4 is an exploded perspective view of the barrel unit 2 according to an embodiment of the present invention.

The barrel unit 2 according to an embodiment of the present invention is configured by four imaging lens groups, and these function as a camera by being mounted on the camera body (not illustrated). The first group lens 11L is held by the first group cylinder 11, the second group lens 12L is held by a second group holder 12, the third group lens 13L is held by a third group unit 13. In addition, the fourth group lens 14L, which is the focus lens, is held by the fourth group holder 14, and includes the mechanism of extending and retracting in the optical axis direction.

Firstly, a stationary cylinder 31 includes a guide unit 31a that guides the first group cylinder 11 forward, and a guide groove 31b that guides the second group holder 12 forward. A forward groove (not illustrated), which is provided on the inner diameter side of the first group cylinder 11, and a guide portion 31b of the stationary cylinder 31 are engaged. In addition, a cam pin 12a of the second group holder 12 and the guide groove 31b of the stationary cylinder 31 are engaged. Due to these being engaged, the rotation action is restricted, and the first group cylinder 11 and the second group holder 12 are guided forward in the optical axis direction without rotating.

Figure 4:
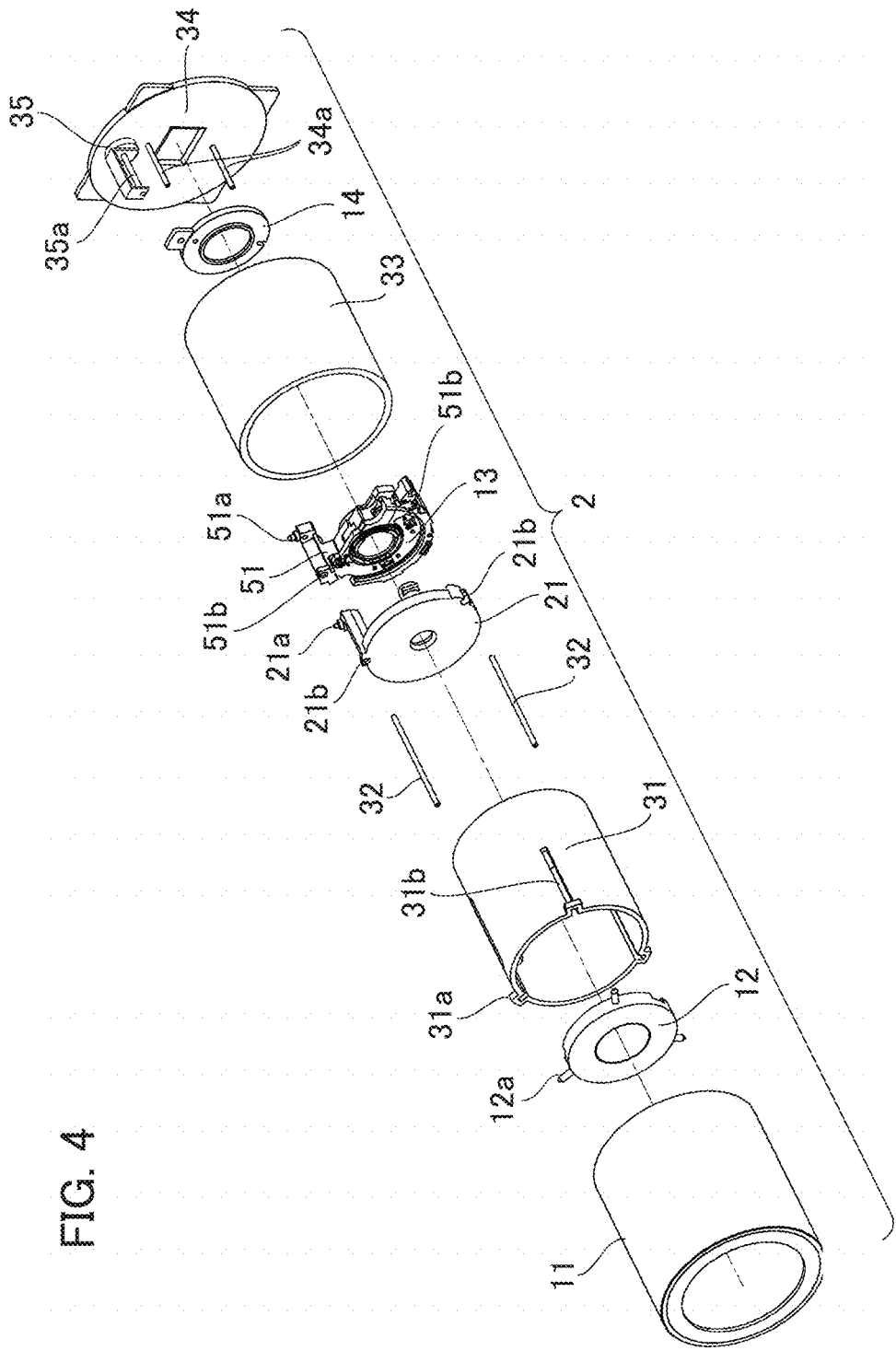
FIG. 4 is a diagram illustrating a configuration of a barrel unit of an imaging apparatus according to an embodiment of the present invention.

In addition, referring to FIG. 4, the stationary cylinder 31 holds two guide bars 32 on the inner diameter side. The guide bars 32 engage the guide portion 21b of the aperture shutter unit 21 that controls the amount of light, and further engages the engagement portion 51b that is provided on a third group base 51 of the third group unit 13. Due to each of these two guide bars 32 engaging, the rotation operation is limited, and the first group cylinder 11 and the second group holder 12 are guided forward in the optical axis direction without rotating.

The cam cylinder 33 has a cam groove (not illustrated) provided on the outer diameter side, and this engages the cam pin 11a of the first group cylinder 11. In addition, a cam groove (not illustrated) is also provided on the inner diameter side, and this respectively engages the cam pin 12a of the second group holder 12, the cam pin 21a of the aperture shutter unit 21, and the cam pin 51a of the third group base 51 of the third group unit 13. The amount of movement in the optical axis direction of each is controlled by the lift amount of these cam grooves. In addition, the cam cylinder 33 rotates the outer periphery of the stationary cylinder 41 centered on the optical axis by the power of the zoom drive motor 302, and each group is moved along the cam grove in the optical axis direction. Due to such a configuration, the barrel unit 2 changes the overall length of the barrel during image capture and while retracted, and each group can be moved in an optical axis direction.

In addition, the sensor holder 34 holds the imaging element 15 and the focus lens drive motor 35. Due to the power of the focus lens drive motor 35, the fourth group holder 14 moves toward the optical axis direction while being guided by the guide shaft 34a. The stationary cylinder 31 and the sensor holder 34 are attached by a bis and the like. The barrel unit 2 is configured as described above, is attached by a bis and the like via the sensor holder 34, and is held by the camera body (not illustrated).

Figure 5A:
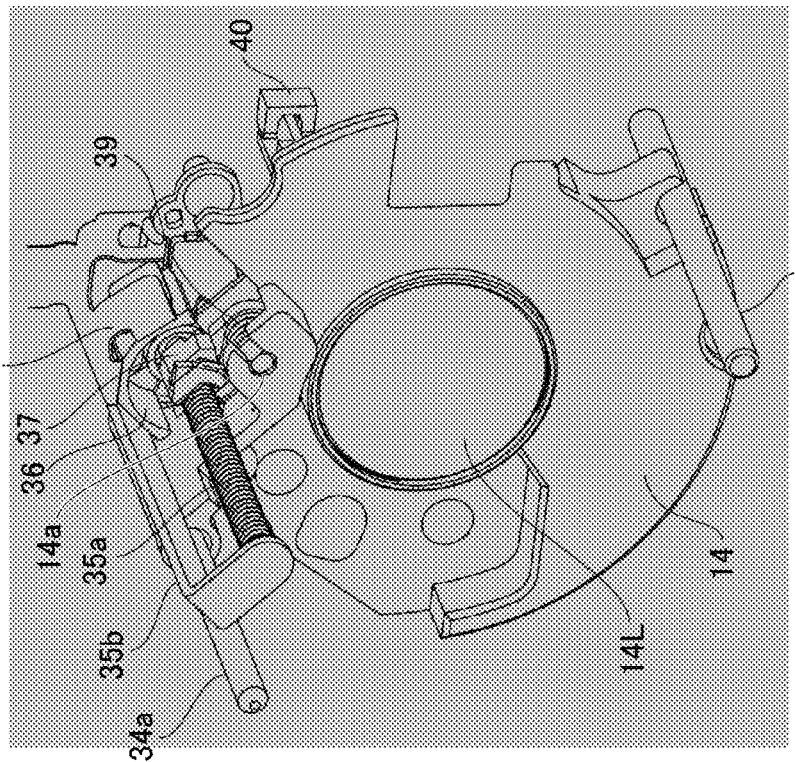
FIGS. 5A and 5B are perspective views of a four group mechanism for the barrel unit according to an embodiment of the present invention.
Figure 5B:
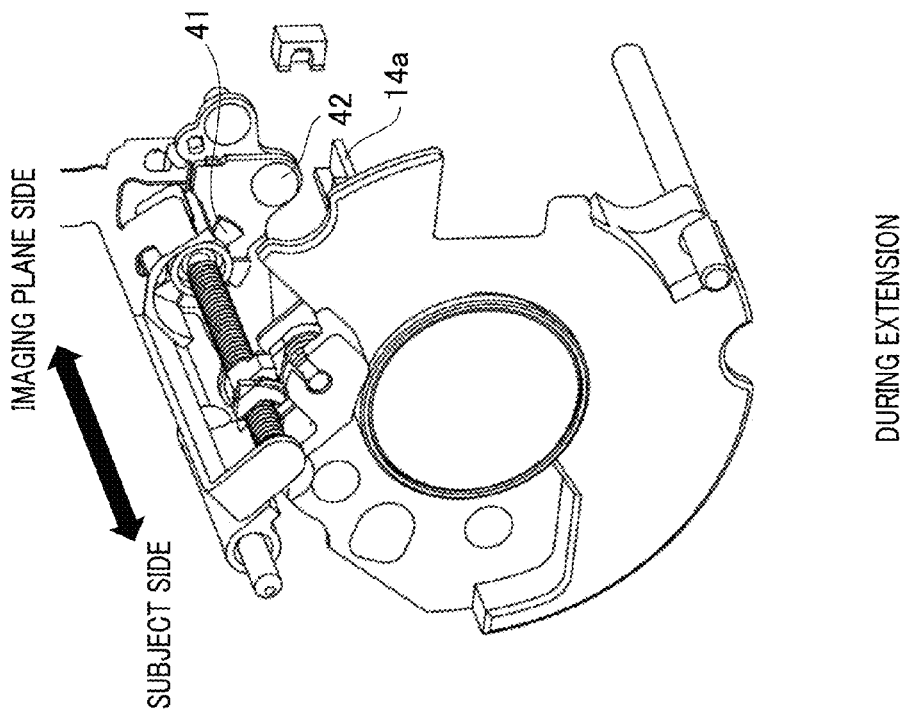
Figure 6:
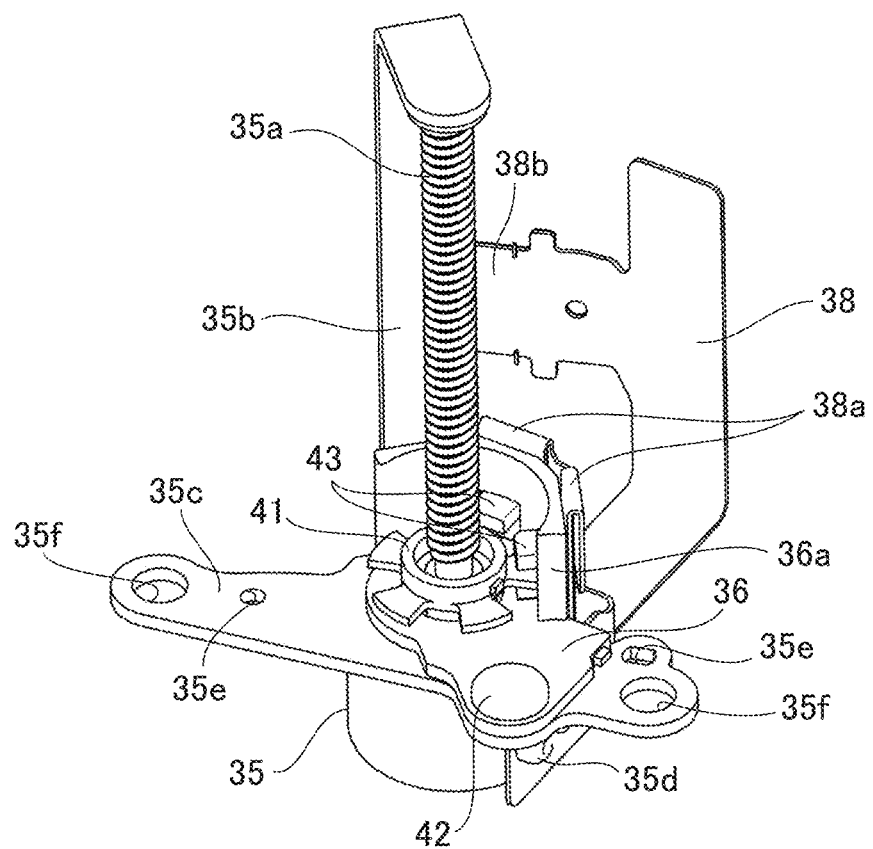
FIG. 6 is an enlarged view of the configuration of the four group mechanism for the barrel unit according to an embodiment of the present invention.

Next, the mechanical mechanism in the vicinity of the fourth group (the focus group) will be explained with reference to FIGS. 5A and 5B, and FIG. 6. FIG. 5A is a perspective view when the fourth group holder is retracted, and FIG. 5B is a perspective view when the fourth group holder is extended. FIG. 6 is an enlarged view of the configuration of the fourth group mechanism of the barrel unit.

Firstly, the fourth group holder 14 fits the shaft of the rack 37 into the shaft hole portion 14a and eliminates the play therebetween in an optical axis direction by a compression spring 39. In addition, the compression spring 39 also has the function of a torsion spring, and has the role of biasing a portion of the teeth of the rack 37 toward the screw 35a. The focus lens driving motor 35 attaches the pulse plate 41 to the base of the screw 35a, as shown in FIG. 6, and enables integral rotation with the screw 35a. The signal of this pulse plate 41 is counted by the two photo interrupters 43, and detection of the rotation direction is also carried out by applying the phase difference of the contrast. The photo interceptor 43 is held by the photo interrupter holder 36, and the photo interrupter holder 36 is fastened by the brush portion 35c of the focus lens drive motor 35 and the bis 42. The signal line of the photo interrupter 43 is drawn from the surface package portion 38a and grouped by signal line from the end portion 35d of the focus lens drive motor 35 and the flexible plate 38, and electrically connected to the control unit 311 from the connector unit 38b. In addition, by making the mechanism configuration into a unit as shown in FIG. 6, along with the performance characteristic check of the focus lens drive motor 35, the light and dark signal of the photo interrupter 43, the phase difference between two signals and the like can be detected and managed together. This photo lens drive motor 35 is positioned by the positioning hole 35a with respect to the sensor holder 34, and is fastened to the sensor holder 34 by a bis via a bis hole 35f. Here, the pulse signal of the rotation of the photo lens drive motor 35 by the pulse plate 41 is used in the phase detection of the photo lens drive motor 35, the speed detection, and the synchronism loss detection and the like.

The screw 35a turns when the focus lens drive motor 35 is energized, and the rack 37 that meshes with this screw 35a extends and retracts in an optical axis direction. At this time, the fourth group holder 14 also extends and retracts in an optical axis direction following the rack 37, and can be moved up to a desired position by a predetermined shift pulse. In FIG. 5A, a projecting portion 14a of the fourth group holder 14 enters the focus reset photo interrupter 40, outputs a dark signal, and, as shown in FIG. 5B, although when extended this changes to a light signal, the switching timing between light and dark is set as the reference for the shift pulse.

Next, the drive method for the focus lens drive motor 35 of the barrel unit 2 will be explained. Firstly, the speed of the stepping motor will be explained. As described above, the focus lens drive motor 35 according to an embodiment of the present invention uses a stepping motor. The speed of the focus lens drive motor 35 is divided into a plurality of speed areas (self-activation area, through-the-lens area, and advance angle control area). Among these, the self-activation area and the through-the-lens area are speed areas in which open loop control is carried out. In open loop control, control is carried out without feeding back an output signal from the focus encoder 317 that is attached to the focus lens drive motor 35. In contrast, the advance angle control area is a speed area in which closed loop control (feedback control) is carried out. In closed loop control, control is carried out by feeding back an output signal from the focus encoder 317 that is attached to the focus lens drive motor 35.

Figure 7:
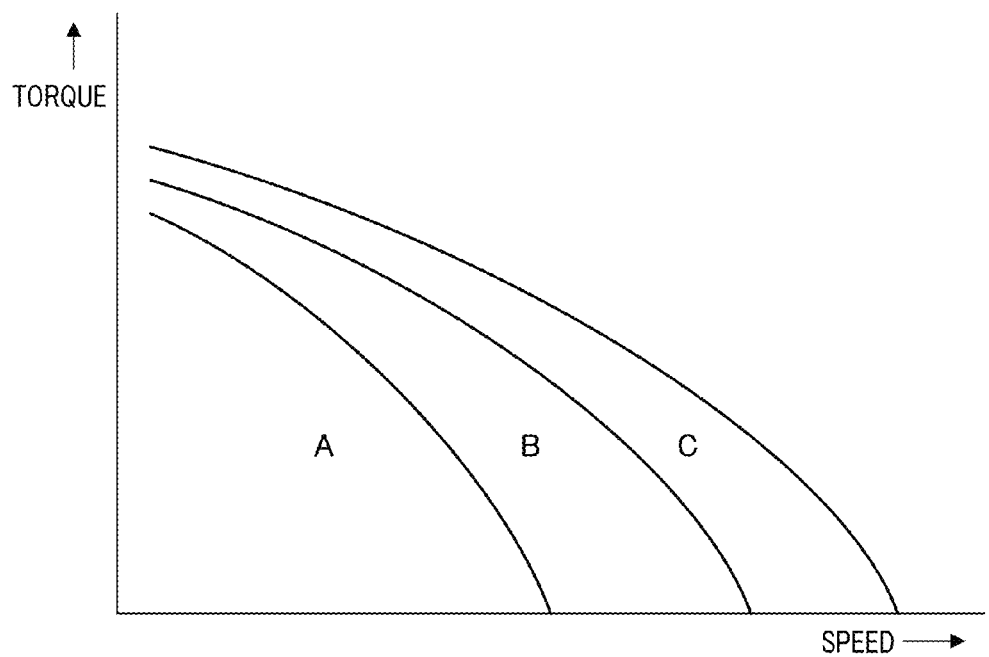
FIG. 7 is a graph that shows the relationship between the speed and torque of the stepping motor.

FIG. 7 is a graph illustrating the relationship between the speed area, the drive speed, and the torque, where the abscissa is the drive speed of the focus lens drive motor 35 and the ordinate is the torque. Firstly, in FIG. 17, area A shows the self-activation area, area B shows the through-the-lens area, and area C shows the advance angle area. The speed at which the stepping motor can drive is a higher speed in the order of self-activation area<through-the-lens area<advance angle control area. The speed of the self-activation area is a speed at which the motor operates without losing synchronization even when activated from a stopped state. The speed of the through-the-lens area is the speed at which operation is carried out by acceleration and deceleration without losing synchronization. The speed of the advance angle control area is the speed at which drive can be carried out by carrying out advance angle control.

Figure 8:
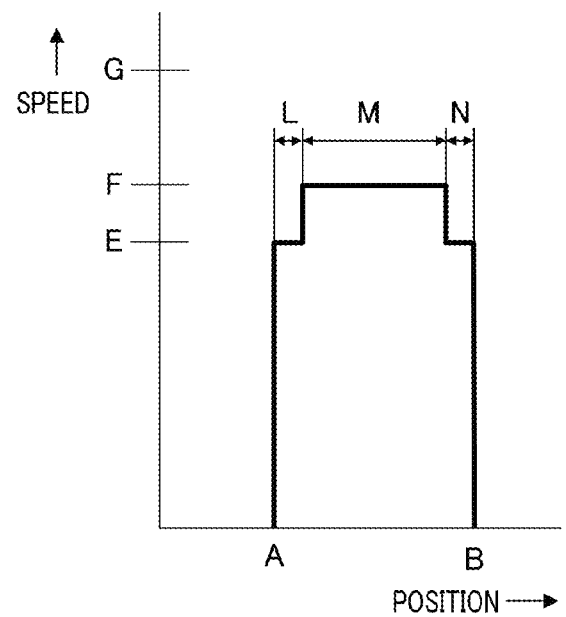
FIG. 8 is a graph illustrating the position and speed of the through-the-lens area drive according to an embodiment of the present invention.

Next, FIG. 8 is a graph illustrating the relationship between the speed and position when used from the self-activation area to the through-the-lens area. The abscissa is the position of the focus lens and the ordinate is the drive speed of the focus lens drive motor 35. A represents the drive start position and B represents the dive end position. E represents the self-activation area speed, F represents the through-the-lens area speed, and G represents the leading edge control speed. In addition, L represents the acceleration range, N represents the deceleration range, and M represents the drive range in the through-the-lens area.

In the case in which the through-the-lens area speed is used, acceleration-deceleration processing (L and N in FIG. 8) is necessary. When acceleration-deceleration processing is not carried out, the focus lens drive motor 35 loses synchronization and does not operate normally. The acceleration-deceleration processing drives a predetermined amount at the self-activation area speed before reaching the through-the-lens area speed. Because this predetermined amount differs depending on the weight of the object being moved and the torque of the motor and the like, the predetermined amount may be determined in a range in which the actual assembly is moved without losing synchronization. That is, in the case in which the through-the-lens area speed is used, the movement amount that also takes into consideration the movement amount used in acceleration and deceleration is necessary.

Figure 9:
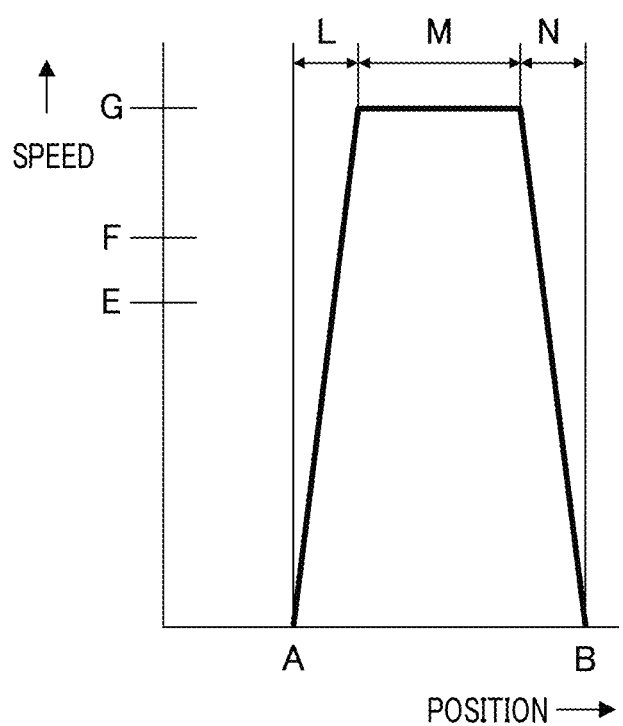
FIG. 9 is a graph illustrating the position and speed of the advance angle area drive according to an embodiment of the present invention.

Next, FIG. 9 is a graph illustrating the relationship between the speed and position when used until the advance angle area speed. Similar to FIG. 8, the abscissa is the position of the focus lens and the ordinate is the drive speed. In addition, A, B, E, F, and G are identical to those in FIG. 8, and the explanation thereof is omitted. L represents the acceleration range, N represents the deceleration range, and M represents the drive range in the advance angle area. In the case in which the advance angle area speed is used, acceleration-deceleration processing (L and N in FIG. 9) is necessary while carrying out advance angle control. When this acceleration-deceleration processing is not carried out, the focus lens drive motor 35 loses synchronization and does not operate normally.

The acceleration-deceleration processing drives a predetermined amount until reaching the target advance angle acceleration. This predetermined amount may be determined in a range in which the actual assembly is moved without losing synchronization because this differs depending on the weight of the driven object and the torque of the motor and the like. That is, even in the case in which the advance angle area speed is used, a movement amount that also takes into account the movement amount used in acceleration and deceleration is necessary.

Figure 10:
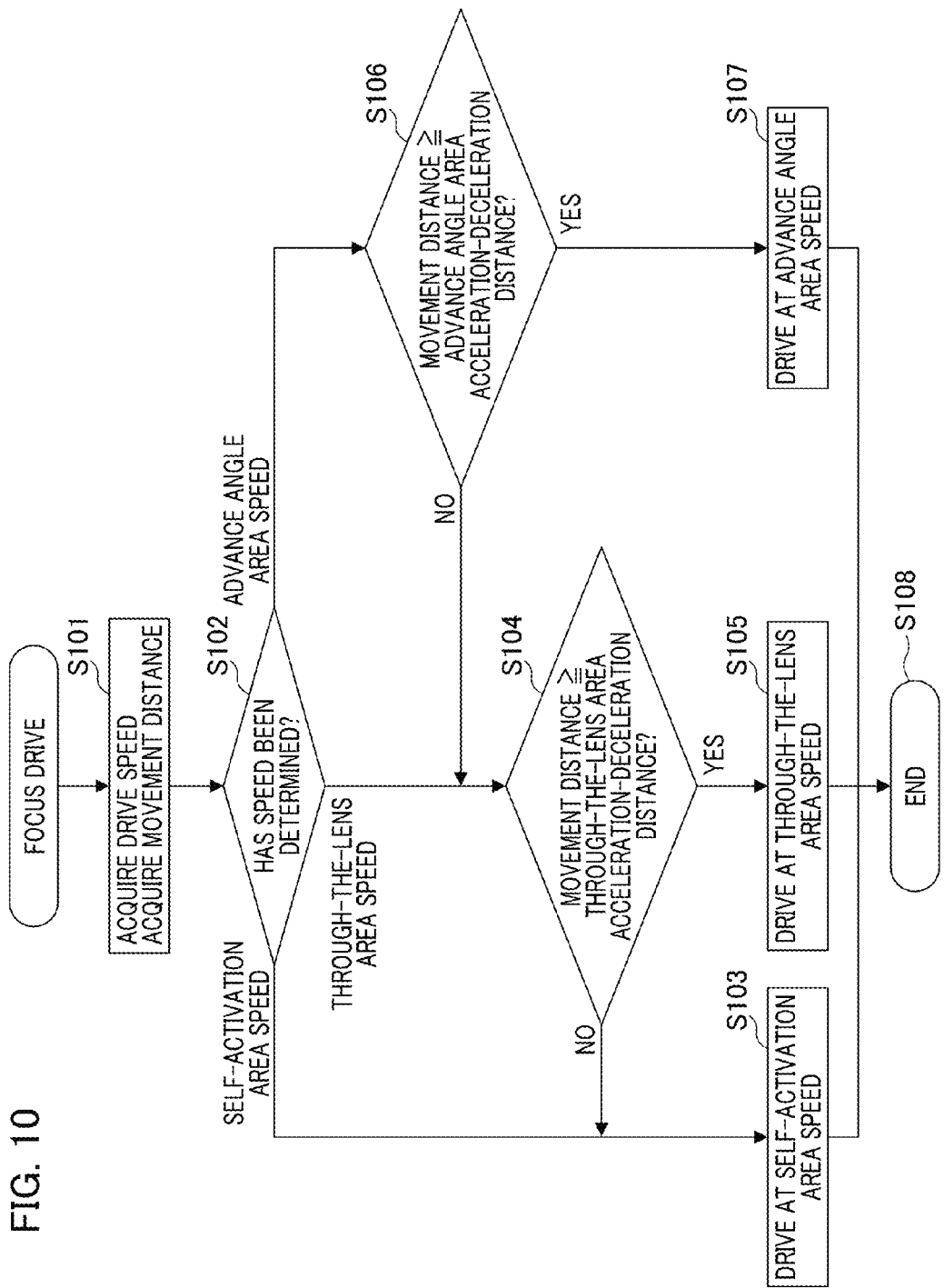
FIG. 10 is a flowchart according to an embodiment of the present invention.

Next, the method in which the drive is selected according to the drive speed and the movement distance (drive amount) will be explained with reference to the flowchart in FIG. 10. Firstly, the control unit 311 obtains the drive speed and the movement distance that are necessary for an AF (autofocus) operation (step S101). At this time, the drive speed and the movement distance are decided by an algorithm for AF action. The range of searching for the focus position and the speed of searching are determined by the state of the imaging element and the magnification of the zoom lens and the like, and the range of searching is the movement distance of the focus drive and the speed of searching is the speed of the focus drive. Here, the movement distance is, for example, the distance from position A to position B in FIG. 8 or from position A to position B in FIG. 9.

Next, the control unit 113 determines one speed area among any of the self-activation area, the through-the-lens area, and the advance angle area, based on the obtained drive speed (step S102). In the case in which the obtained drive speed is the self-activation area speed, processing advances to step S103, and the control unit 113 drives at the self-activation speed. In the case in which the obtained drive speed is the speed of the through-the-lens area, the control unit 113 advances to step S104, and compares the obtained movement distance and the acceleration-deceleration distance of the through-the-lens area speed. In addition, in the case in which the obtained drive speed is the speed of the advance angle area, processing advances to step S106, and the control unit 311 compares the movement distance and the acceleration-deceleration distance of the advance angle area speed.

Next, if the obtained movement distance is a distance equal to or greater than the acceleration-deceleration distance of the through-the-lens area speed (YES in step S104), processing advances to step S105, and the control unit 311 drives at the through-the-lens area speed. In contrast, if the obtained movement distance is a distance that is less than the acceleration-deceleration distance of the through-the-lens area speed (NO in step S104), because the speed of the through-the-lens area cannot be achieved, processing advances to step S103, and the control unit 113 drives at the self-activation speed. In addition, if the obtained movement distance is a distance that is equal to or greater than the acceleration-deceleration distance of the advance angle area speed (YES in step S106), processing advances to step S107, and the control unit 311 drives at the advance angle area speed. In contrast, if the acquired movement distance is less than the acceleration-deceleration distance of the advance angle area speed (NO in step S106), because the speed of the advance angle area cannot be achieved, processing advances to step S104 and the control unit 311 compares the obtained movement distance with the acceleration-deceleration distance of the through-the-lens area speed. After driving at each of the drive areas, the control unit 113 ends processing at step S108.

Figure 11:
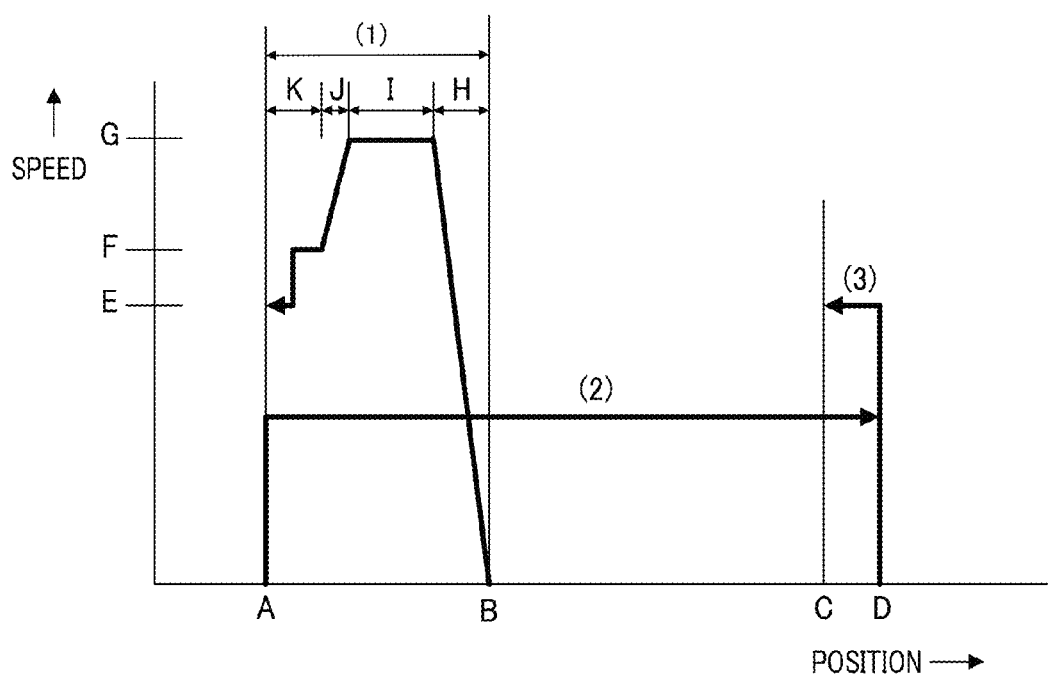
FIG. 11 is a graph illustrating the relationship between the position and speed of the AF drive.

Next, referring to FIG. 11, the operation of the focus group when carrying out a focus operation by using contrast AF (autofocus) will be explained. FIG. 11 is a graph for explaining the movement of the focus group, which is the lens group that carries out focusing, when carrying out contrast AF. Firstly, the abscissa shows the position of the focus lens and the ordinate is the drive speed of the focus group. The focus group is driven by the above-described focus lens drive motor 35, and thus, the position of the focus group is determined by the rotation number and the rotation direction of the focus lens drive motor 35, and this drive speed is determined by the drive speed of the focus lens drive motor 35.

A in FIG. 11 shows the scan start position of the contrast AF, and B shows the stop position before contrast AF of the focus group (that is, the start position of the contrast AF action). In addition, C in FIG. 11 shows the focus position of the contrast AF, and D shows the scan end position of the contrast AF. Furthermore, E in FIG. 11 shows the self-activation area speed, F shows the through-the-lens area speed, and G shows the advance angle area speed.

Next, the focus operation of the contrast AF will be explained. Firstly, the control unit 311 moves the focus group, which is at the stop position B before contrast AF, to the scan start position A (the action (1) in the figure). At this time, the movement time from the stop position B to the start position A is preferably as short as possible. In addition, (1) in FIG. 10 shows the movement distance from the stop position B to the start position A. H represents the acceleration distance for reaching the advance angle area speed. Next, after acceleration at H, the control unit 311 drives at the high-speed advance angle area speed during a predetermined amount I. This predetermined amount I may be an amount calculated by subtracting from the movement distance (1) the amount necessary for acceleration and the amount necessary for deceleration. Specifically, the movement amount I=(1)−H−J−K. In addition, J is the deceleration distance from the advance angle area to the through-the-lens area, and K is the deceleration distance from the through-the-lens area to the self-activation area.

As processing for the contrast AF, firstly, an evaluation value for contrast is found based on the image data that has been captured by the imaging element 15. The AF operation is carried out by using the property that the evaluation value of the contrast becomes larger as the focus approaches the focus position. At K, the control unit 311 carries out deceleration in line with the timing at which the evaluation value of the contrast can be obtained. When the focus group reaches the contrast AF start position A, the control unit 311 next carries out a scan operation (the operation of (2) in the figure).

The object of this scan operation is to search for a focus position. The control unit 311 obtains the evaluation value for the contrast while driving the focus group from the scan start position A to the scan end position D, and finds the maximum value of the evaluation value. Next, the control unit 311 stops the drive of the focus group when the maximum value of the evaluation value has been found. Because the drive speed of the scan operation takes the correspondence between the position of the focus group and the contrast evaluation value at a higher speed, a speed that periodically moves a predetermined amount that can obtain the contrast evaluation value is set. This predetermined amount may make the blur amount of the focus, that is, the focus depth pulse, the standard.

Next, when the focus group reaches the scan end position D, the control unit 311 carries out a focus position movement operation (the operation (3) in the figure). The focus position movement is a movement at a high speed from the scan end position D to the focus position C that was found during the scan. When the movement of the focus group to the focus position C has completed, the focus operation using contrast AF is completed. In this manner, an example of the drive for the contrast AF has been shown, but the drive distance of each operation changes due to the position change of the start position A because of the properties of the lens and operations before contrast AF. Due to this drive distance, there are cases in which the drive distance for acceleration or deceleration cannot be ensured.

Figure 12:
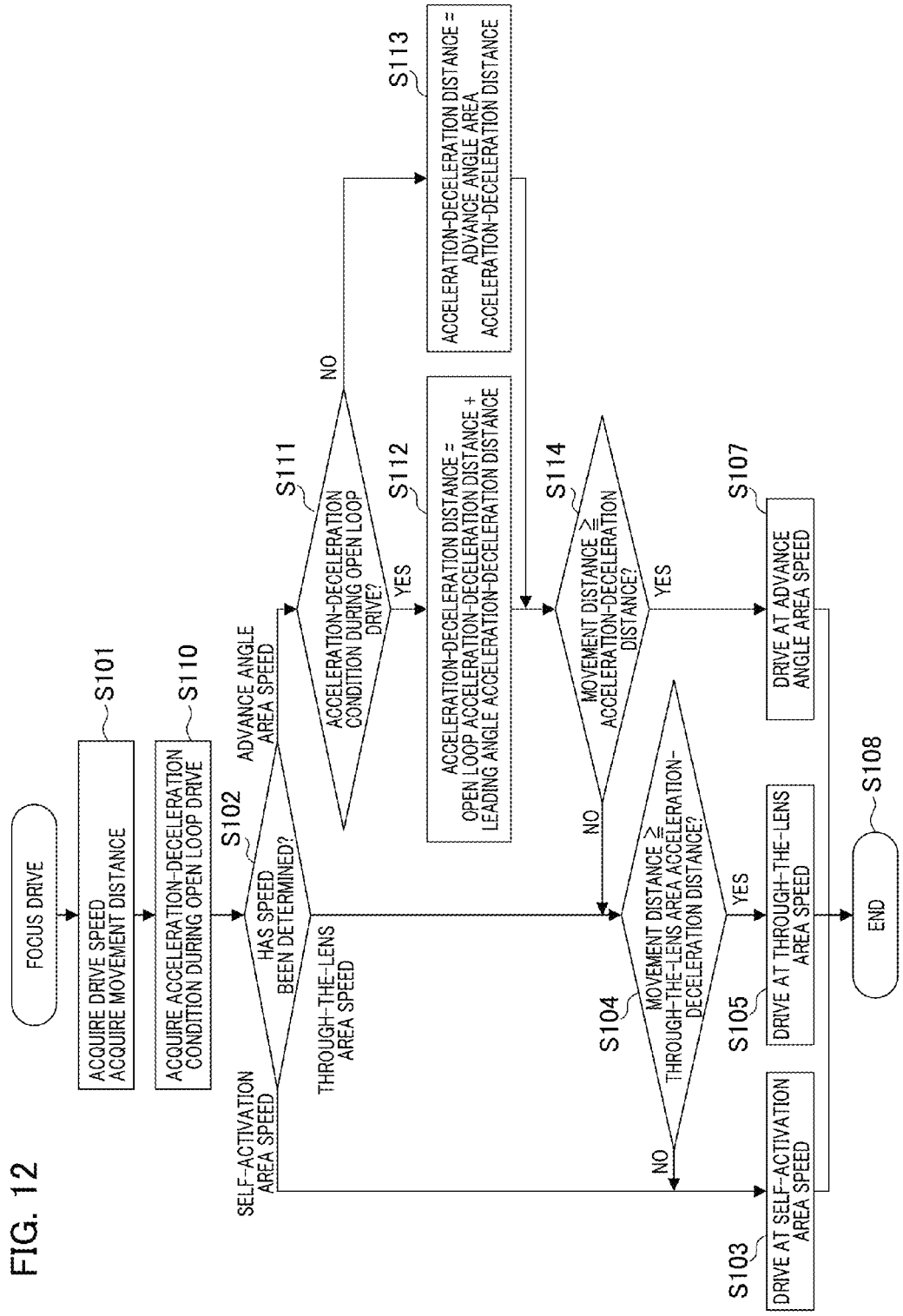
FIG. 12 is a flowchart according to an embodiment of the present invention.

Next, the method for selecting the drive according to the drive speed and the movement distance (drive amount) will be explained with reference to FIG. 12. Note that the processing that is identical to that of FIG. 10 is represented by the same reference numerals, and the detailed explanation thereof is omitted. The flowchart shown in FIG. 12 shows the operations carried out each time when the focus group is driven. For example, this is the operation carried out each time when the drive (1) followed by (2), which in turn is followed by (3) in FIG. 11 are carried out. Here, as one example, the operation of (1) in FIG. 11 in the case in which deceleration processing (K) of the through-the-lens area and the self-activation area from the advance angle area (H, I, and J) is necessary will be explained. The drive of the advance angle area is a closed loop control because it is used in control that feeds back the signal output from the focus encoder 317 that is attached to the focus lens drive motor 35. In contrast, the self-activation area and the through-the-lens area are open loop controls because they do not carry out feedback of the signal output from the focus encoder 317. In FIG. 12, the open loop is displayed along with the self-activation area and the through-the-lens area.

Firstly, the control unit 311 obtains the drive speed and the movement distance that are necessary for the AF action (step S101). Next, the control unit 311 obtains the acceleration-deceleration conditions corresponding to the portion K in FIG. 11 (step S110). The acceleration-deceleration conditions do not need to be set according to a drive method. For example, in the case of (2) and (3) in FIG. 11, acceleration-deceleration conditions is not set because acceleration-deceleration is not necessary and. In addition, the condition setting may be carried out in order to coordinate the acceleration-deceleration conditions with the evaluation value of the contrast and the drive of the focus group in contrast AF. The processing from step S102 to step S105 is identical to the processing in FIG. 10, and thus, the explanation thereof is omitted.

In the case in which the drive speed has been found to be the advance angle area speed in the speed determination in step S102, processing advances to step S111, and the control unit 311 determines whether or not the acceleration-deceleration condition for the open loop in step S110 has been set. In the case in which the acceleration-deceleration condition for an open loop is set (YES in step S111), processing advances to step S112, and the control unit 311 calculates the acceleration-deceleration distance by adding the acceleration-deceleration distance and the advance angle acceleration-deceleration distance of the open loop. Subsequently, the control unit 311 proceeds to step S114. In contrast, in the case in which the acceleration-deceleration condition for an open loop has not been set (NO in step S111), processing advances to step 113, and the acceleration-deceleration distance is treated as the advance angle acceleration-deceleration distance, and subsequently, processing advances to step S114.

Next, the control unit 311 carries out a determination of the overall movement distance and the acceleration-deceleration distance in step S114. In the case in which the overall movement distance is equal to or greater than an acceleration-deceleration distance (YES in step S114), processing advances to step S107, and the control unit 311 drives at the advance angle area speed. In contrast, in the case in which the overall movement distance is less than the acceleration-deceleration distance (NO in step 114), processing advances to step S104, and similar to FIG. 10, the control unit 311 carries out a comparison of the obtained movement distance and the acceleration-deceleration distance of the through-the-lens area speed. After the control unit 311 has driven at each drive area, the processing ends in step S108.

Above, the preferred embodiments of the present invention were explained, but the present invention is not limited thereto, and various changes and modifications within the scope of the spirit of the invention are possible.

The present invention may also be realized by executing the following processing. Specifically, software (program) for realizing the functions of the aforementioned embodiments is supplied to a system or an apparatus via a network or various types of storage mediums, and then the computer (or CPU, MPU, or the like) of the system or the apparatus reads out the program for execution.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-177184 filed Aug. 9, 2012 which is hereby incorporated by reference herein in its entirety.

What is claimed is:

1. An optical member drive control apparatus, comprising:
an acquiring unit configured to acquire first information corresponding to a movement speed of an optical member when a movement of the optical member is controlled and second information corresponding to a movement amount of the optical member; and
a controller configured to output a signal to an actuator that moves the optical member and to be able to detect a driven amount of the actuator per unit time,
wherein the controller carries out at least a first mode that is closed loop control of the actuator according to the detection result of the driven amount of the actuator per unit time and a second mode that is open loop control of the actuator, and
wherein the controller selects the first mode or the second mode based on the first information and the second information that have been acquired by the acquiring unit.

2. The optical member drive control apparatus according to claim 1, wherein the controller selects the first mode or the second mode based on the first information that has been acquired by the acquiring unit and corrects the selection based on the second information that has been acquired by the acquiring unit.

3. The optical member drive control apparatus according to claim 1, wherein the controller further includes a third mode,
wherein the second mode is open loop control that accompanies acceleration control and the third mode is open loop control that does not accompany acceleration control, and
wherein the controller selects the first mode, the second mode, or the third mode based on the first information and the second information that has been acquired by the acquiring unit.

4. The optical member drive control apparatus according to claim 1, wherein the selected mode is changed when the movement amount of the optical member is smaller than a predetermined movement amount based on the information acquired by the acquisition unit even after the controller has selected a control mode.

5. The optical member drive control apparatus according to claim 1, wherein the optical member is a focus lens.

6. The optical member drive control apparatus according to claim 1, wherein the acquiring movement acquires third information corresponding to a time required to stop deceleration, and the controller selects the first mode or the second mode based on first information, second information, and third information that have been acquired by the acquisition unit.

7. The optical member drive control apparatus according to claim 1, wherein the movement of the optical member accompanies a reverse operation.

8. The optical member drive control apparatus according to claim 1, wherein the actuator includes a motor and includes an encoder that detects a rotation of a rotor of the motor, and
wherein the driven amount per unit of time of the actuator is detected based on the output of the encoder.

9. The optical member drive control apparatus according to claim 1, wherein the actuator includes a motor and includes an encoder that detects a rotation of a rotor of the motor, and wherein the closed loop control carries out feedback control of the motor based on the output signal from the encoder.

10. An optical apparatus comprising the optical member drive control apparatus according to claim 1 and the optical member.

11. An imaging apparatus comprising the optical member drive control apparatus according to claim 1 and a sensor.

12. A control method for an optical member drive control apparatus, the method comprising:
acquiring first information corresponding to a movement speed of an optical member and second information corresponding to a movement amount of the optical member when the movement of the optical member is controlled, by an acquiring unit; and
outputting a signal to an actuator that moves the optical member and detecting a driven amount of the actuator per unit of time by a controller;
wherein the controller carries out at least a first mode that is closed loop control of the actuator according to the detection result of the driven amount of the actuator per unit of time and a second mode that is open loop control of the actuator, and
wherein the controller selects the first mode or the second mode based on first information and second information that has been acquired by the acquiring unit.

* * * * *